(12) United States Patent
Seto et al.

(10) Patent No.: US 7,178,054 B2
(45) Date of Patent: Feb. 13, 2007

(54) FRAME VALIDATION

(75) Inventors: Pak-Lung Seto, Shrewsbury, MA (US); Devicharan Devidas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 10/774,553

(22) Filed: Feb. 9, 2004

(65) Prior Publication Data

US 2005/0188245 A1    Aug. 25, 2005

(51) Int. Cl.
*G06F 11/00* (2006.01)

(52) U.S. Cl. .................................................. 714/5
(58) Field of Classification Search .......... None
See application file for complete search history.

(56) References Cited

U.S. PATENT DOCUMENTS

| | | | | |
|---|---|---|---|---|
| 5,307,351 | A * | 4/1994 | Webster | 370/470 |
| 6,918,080 | B2 * | 7/2005 | Kikuchi et al. | 714/775 |
| 6,961,787 | B2 * | 11/2005 | Ooi | 710/19 |
| 2002/0112068 | A1 * | 8/2002 | Murphy | 709/236 |
| 2005/0204058 | A1 * | 9/2005 | Philbrick et al. | 709/238 |

OTHER PUBLICATIONS

"American National Standard for Information Technology- Fibre Channel-Physical and Signalling Interface-3 (FC-PH-3)", *Developed by incits, Where IT all Begins, Table of Contents*, (1998),6 pgs.
"PCI Express Base Specification Revision 1.0", *PCI Express, Table of Contents*, (Jul. 22, 2002),15 pgs.
"PCI-X Addendum to the PCI Local Bus Specification", *Revision 1.0a, Table of Contents*, (Jul. 24, 2000),9 pgs.
"Serial ATA: High Speed Serialized AT Attachment, Serial ATA Workgroup", *Revision 1.0a, Table of Contents*, APT Technologies, Inc.,(Jan. 7, 2003), 10 pgs.
"Working Draft American National Standard, Project T10/1601-D", *Revision 1, Table of Contents*, Information Technology- Serial Attached SCSI- 1.1 (SAS- 1.1),(Sep. 18, 2003),24 pgs.

* cited by examiner

*Primary Examiner*—Reginald Bragdon
*Assistant Examiner*—Daniel Ko
(74) *Attorney, Agent, or Firm*—Grossman, Tucker, Perreault & Pfleger, PLLC (57) ABSTRACT

A method according to one embodiment may include receiving a frame, determining a frame type of the frame, accessing a location of memory associated with the frame type, the location comprising at least one programmable data element, and checking a validity of the frame in response to data in the location of memory associated with the frame type. Of course, many alternatives, variations, and modifications are possible without departing from this embodiment.

24 Claims, 4 Drawing Sheets

FRAME VALIDATION

FIELD

This disclosure relates to frame validation.

BACKGROUND

A conventional data storage system may include one device capable of bidirectional communication with another device. One device may include a computer node having a host bus adapter (HBA). The other device may be mass storage. Each may function as a sending and receiving device in order to exchange data and/or commands with each other using one or more of a variety of communication protocols. Typically, the communication protocol defines various frame types and associated maximum frame lengths. The receiving device may perform a validation process of a received frame which may include performing an error checking calculation, checking if the frame type is a supported frame type, and checking the payload length of the frame.

In this prior art system, firmware may carry out the frame validation process. However, such an approach requires the processing bandwidth of an associated processor and may be relatively slow. Alternatively, in this prior art system, the frame validation process may be performed by hard wired circuitry. However, such hardwired approach lacks flexibility, e.g., it may only support existing frame types already defined by the communication protocol.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
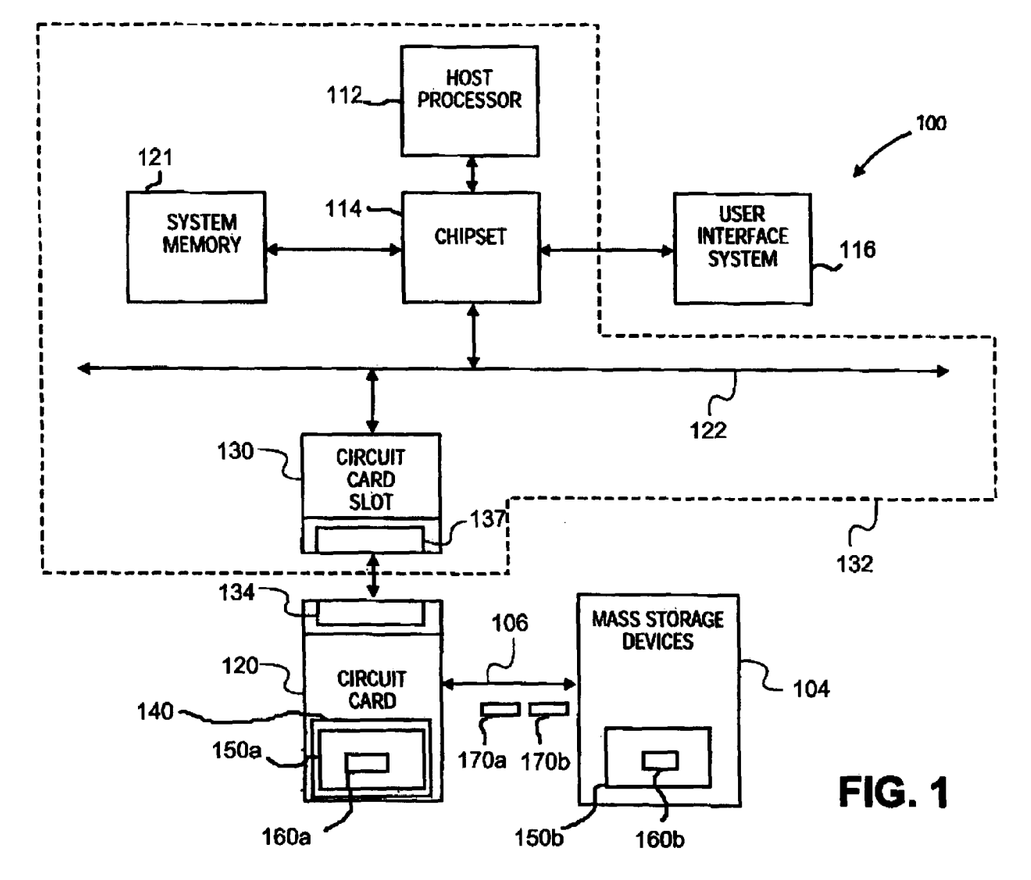
FIG. 1 is a diagram illustrating a system embodiment.

FIG. 1 illustrates a system 100 consistent with an embodiment including a computer node having a host bus adapter (HBA), e.g., circuit card 120. The circuit card 120 is capable of bidirectional communication with mass storage 104 via one or more communication links 106 using one or more communication protocols. Mass storage 104 may include one or more mass storage devices, e.g., one or more redundant array of independent disks (RAID) and/or peripheral-devices.

Such communication between the HBA and mass storage 104 may take place by transmission of one or more frames. As used herein in any embodiment, a "frame" may comprise one or more symbols and/or values. Both the HBA 120 and mass storage 104 may act as a receiving device that receives data and/or commands from the other. Advantageously, each of the HBA 120 and mass storage 104 may have frame validation circuitry 160a, 160b as further detailed herein to perform frame validation checks on received frames. As used herein, "circuitry" may comprise, for example, singly or in any combination, hardwired circuitry, programmable circuitry, state machine circuitry, and/or firmware that stores instructions executed by programmable circuitry.

The system 100 may also generally include a host processor 112, a bus 122, a user interface system 116, a chipset 114, system memory 121, a circuit card slot 130, and a circuit card 120 capable of communicating with mass storage 104. The host processor 112 may include one or more processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may alternatively comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface system 116 may include one or more devices for a human user to input commands and/or data and/or to monitor the system 100 such as, for example, a keyboard, pointing device, and/or video display. The chipset 114 may include a host bridge/hub system (not shown) that couples the processor 112, system memory 121, and user interface system 116 to each other and to the bus 122. Chipset 114 may include one or more integrated circuit chips, such as those selected from integrated circuit chipsets commercially available from the assignee of the subject application (e.g., graphics memory and I/O controller hub chipsets), although other integrated circuit chips may also, or alternatively be used. The processor 112, system memory 121, chipset 114, bus 122, and circuit card slot 130 may be on one circuit board 132 such as a system motherboard.

The circuit card 120 may be constructed to permit it to be inserted into the circuit card slot 130. When the circuit card 120 is properly inserted into the slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114.

Alternatively, without departing from this embodiment, the operative circuitry of the circuit card 120 may be included in other structures, systems, and/or devices. These other structures, systems, and/or devices may be, for example, in the motherboard 132; and coupled to the bus 122. These other structures, systems, and/or devices may also be, for example, comprised in chipset 114.

The circuit card 120 may communicate with mass storage 104 via one or more communication links 106 using one or more communication protocols. Exemplary communication protocols may include Fibre Channel (FC), Serial Advanced Technology Attachment (S-ATA), and/or Serial Attached Small Computer Systems Interface (SAS) protocol. If a FC protocol is used by circuit card 120 to exchange data and/or commands with mass storage 104, it may comply or be compatible with the interface/protocol described in ANSI Standard Fibre Channel (FC) Physical and Signaling Interface-3 X3.303:1998 Specification. Alternatively, if a S-ATA protocol is used by circuit card 120 to exchange data and/or commands with mass storage 104, it may comply or be compatible with the protocol described in "Serial ATA: High Speed Serialized AT Attachment," Revision 1.0a, published on Jan. 7, 2003 by the Serial ATA Working Group. Further alternatively, if a SAS protocol is used by circuit card 120 to exchange data and/or commands with mass storage 104, it may comply or be compatible with the protocol described in "Information Technology—Serial Attached SCSI—1.1 (SAS)," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or later-published versions of the SAS Standard.

To accomplish such communication using any variety of communication protocols such as SAS, S-ATA, and FC protocols; the circuit card 120 may have protocol engine circuitry 150*a*. The protocol engine circuitry 150*a* may exchange data and commands with mass storage 104 by transmission and reception of one or more frames, e.g., frames 170*a*, 170*b*. A large number of frames from many different devices such as mass storage devices and HBAs may be transmitted via communication links 106. The protocol engine circuitry 150*a* may be included in an integrated circuit 140. As used herein, an "integrated circuit" means a semiconductor device and/or microelectronic device, such as, for example, a semiconductor integrated circuit chip.

Advantageously, the HBA 120 may include frame validation circuitry 160*a* to validate received frames, e.g., frames 170*a*, 170*b*. Mass storage 104 may also include similar data frame validation circuitry 160*b*. Such frame validation circuitry 160*a*, 160*b* may be included in the protocol engine circuitry 150*a*, 150*b* as illustrated in FIG. 1 or, alternatively, may be stand alone circuitry or included in other circuitry. The protocol engine circuitry 150*a*, 150*b* may be comprised in an associated integrated circuit.

Figure 2:
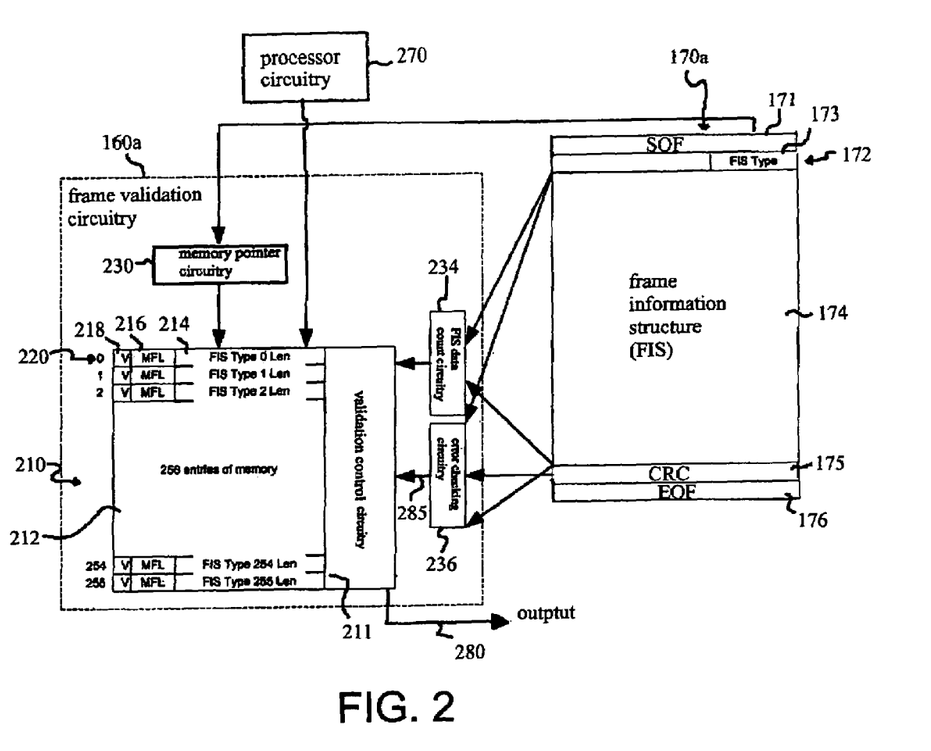
FIG. 2 is a diagram illustrating frame validation circuitry in the system of FIG. 1.

FIG. 2 illustrates frame validation circuitry 160*a* that may be included in the circuit card 120 of the system 100 of FIG. 1. In general, the frame validation circuitry 160*a* may include memory 210, memory pointer circuitry 230, error checking circuitry 236, and FIS data count circuitry 234. The frame validation circuitry 160*a* may perform frame validation operations for a received frame, e.g., a S-ATA compliant frame 170*a*.

The exemplary S-ATA compliant frame 170*a* may include a start of frame (SOF) primitive 171 to indicate the start of the frame 170*a*. A "primitive" as used herein may be defined as a group of one or more symbols, for example, representing control data to facilitate control of the transfer of information and/or to provide real time status information. A frame header 172 may follow the SOF primitive 171. The frame header 172 may include, among other things, information indicating the frame information structure (FIS) type 173. Following the frame header portion 172 may be the FIS 174. As used herein, the "FIS" may be defined as a portion of the frame that comprises payload. The length of the FIS 174 may be based on the specified FIS type 173. An error checking code may follow the FIS 174. An error checking code may include a cyclic redundancy check (CRC) 175 to facilitate checking of the validity of the received data in the FIS 174. Finally, an end of frame (EOF) primitive 176 may follow the CRC 175 to mark the end of the frame 170*a*. By the time frame 170*a* is evaluated by the frame validation circuitry 160*a* the SOF and EOF primitives may have been stripped away by other circuitry.

After transmission of the S-ATA compliant frame 170*a*, the sending device may send a wait for frame termination (WTRM) primitive. Such a WTRM is a handshake primitive which indicates the transmitting device is waiting for a reception status reply from the receiving device. In the interim, the receiving device may perform frame validation operations utilizing the frame validation circuitry 160*a*. These frame validation operations may include performing an error checking calculation, checking if the frame type is a supported frame type, and checking if the payload length of the FIS exceeds, and/or is different from, an associated length. The frame validation circuitry 160*a* may provide an output signal representative of a positive or negative reception status. This output signal may be provided by validation control circuitry 211 in memory 210. Additional circuitry of the receiving device may be responsive to this output signal to provide a response signal to the transmitting device. The response signal may be a reception error primitive (R_ERR) signal indicating the receiving device detected an error in the received FIS. Alternatively, the response signal may be a reception with no error primitive (R_OK) signal indicating the receiving device did not detect an error in the received FIS.

The frame validation circuitry 160*a* may include memory 210. The memory 210 may include one or more machine readable storage media such as random-access memory (RAM), dynamic RAM (DRAM), magnetic disk (e.g. floppy disk and hard drive) memory, optical disk (e.g. CD-ROM) memory, and/or any other device that can store information.

The memory 210 may include an array 212 portion and validation control circuitry 211. In general, the array 212 may include locations associated with a predetermined frame type. For example, the array may include a table having a plurality of row entries where each row entry may include a number of data elements. Advantageously, a location of the memory array, e.g., at least one row of a table, has a programmable data element. As used herein, a "programmable data element" is a data element that may be modified. The number of row entries in the array 212 may correspond to the maximum possible number of supported frame types. Given S-ATA protocol for example, the array 212 may include two hundred and fifty six associated row entries.

Each row entry of the array 212 may include various data elements, such as, check bits.

Two exemplary check bits may include a supported or valid (V) check bit and a maximum frame length check bit (MFL), e.g., V check bit 218 and MFL check bit 216 of row entry 220. The V check bit may be used to indicate if the frame type is supported. If the V check bit is asserted, the frame may be recognized as a valid frame type and other checks may occur. If the V check bit is de-asserted, any frame with the associated frame type may not be checked at all by any parts of the frame validation circuitry 160*a* and a negative reception status response may then be provided, e.g., a R_ERR primitive.

The MFL check bit may be used to indicate if the maximum frame length will be checked. If the MFL check bit is asserted, the length of the received frame may be checked against the expected frame length. If the MFL check bit is de-asserted, the length of the received frame may not be checked against the expected frame length for that particular frame type. For example, a frame type may be valid and supported (hence V bit asserted) but have a maximum frame length of a variable nature that may not be checked in certain instances (hence MFL bit de-asserted). In addition, each row entry of the array 212 may include a FIS type and associated maximum length for that FIS type. For example, the first row entry 220 may include reference to a first FIS type (Type 0) and an associated length for that FIS type.

Memory pointer circuitry 230 examines and interprets information in the field type 173 from the received frame 170a to ascertain the specified field type, and points to the applicable row entry in array 212 associated with the specific field type. For instance, if memory pointer circuitry 230 determines FIS type 0 is indicated in the FIS type field 173, it will point to data in row entry 220 associated with FIS type 0.

Advantageously, the data elements of each row entry, e.g., the valid check bits and the field length, of the array 212 may be programmable data elements to provide flexibility to the frame validation circuitry 160a. For instance, such programmability may enable the frame validation circuitry 160a to accommodate customer specific FIS types having customer specific field lengths. In addition, such programmability may enable customer specific field lengths to be entered for established field types. For example, a Data—Host to Device FIS type, or Device to Host (bidirectional) FIS type may be limited to transmitting no more than 2,048 Dwords or 8,192 bytes in any one Data FIS. In this embodiment, a "Dword" may contain four bytes or thirty two bits of data. The programmable frame length data element may allow a lower customer specific limitation than the typical 2,048 Dwords in this instance, e.g., to 1,000 Dwords or 4,000 bytes.

Furthermore, a customer may wish to have one or more specific FIS types summarily rejected. In such an instance, the programmable V check bit data element for one or more FIS types may be programmed to be de-asserted. In addition, as new FIS types are created, available row entries in array 212 may be appropriately programmed to accommodate the new FIS types and associated lengths as appropriate. Accordingly, the FIS validation circuitry 160a may support new FIS types.

Any variety of circuitry may be utilized to amend or update the programmable data elements in various rows entries of the memory array 212. For example, in one instance, such circuitry may include a processor, e.g., processor 112 or processor circuitry 270, for executing instructions stored on a machine readable medium. A user via a user interface such as user interface system 116 may also program such programmable data elements.

The error checking circuitry 236, e.g., CRC checking circuitry, may receive both the CRC 175 and the FIS 174 from the frame 170a. The error checking circuitry 236 may apply the same mathematical calculation to the received FIS that was performed on the transmitted FIS, e.g., this may be a 16 bit polynomial calculation. The error checking circuitry 236 may then compare the result of its calculation based on the received FIS with the result of the calculation applied on the transmitted FIS as indicated in the CRC 175. If the CRC and the result match, then the data in the FIS is determined by the error checking circuitry 236 to have been sent successfully. If they do not agree, then the error checking circuitry 236 determines that there is an error in the received FIS. The error checking circuitry 236 may then provide the result of its check to the validation control circuitry 211 of memory 210 by providing an error calculation result signal via path 285.

The FIS data count circuitry 234 is responsive to the received FIS 174 to count length units of the received FIS. The length units may be units such as bytes, bits, or Dwords. Various types of S-ATA compliant frames may have an expected length specified in Dwords. For example, a Register—Host to Device frame type defined by the S-ATA protocol may define a length of that FIS type as five Dwords. The FIS data count circuitry 234 may provide the result of its FIS data count to the validation control circuitry 211 portion of memory 210.

The validation control circuitry 211 of memory 210 may perform validation control operations as detailed herein and may provide an output signal via path 280 as a result thereof. The validation control circuitry 211 of memory 210 may comprise machine readable firmware program instructions to perform the validation control operations.

Figure 3:
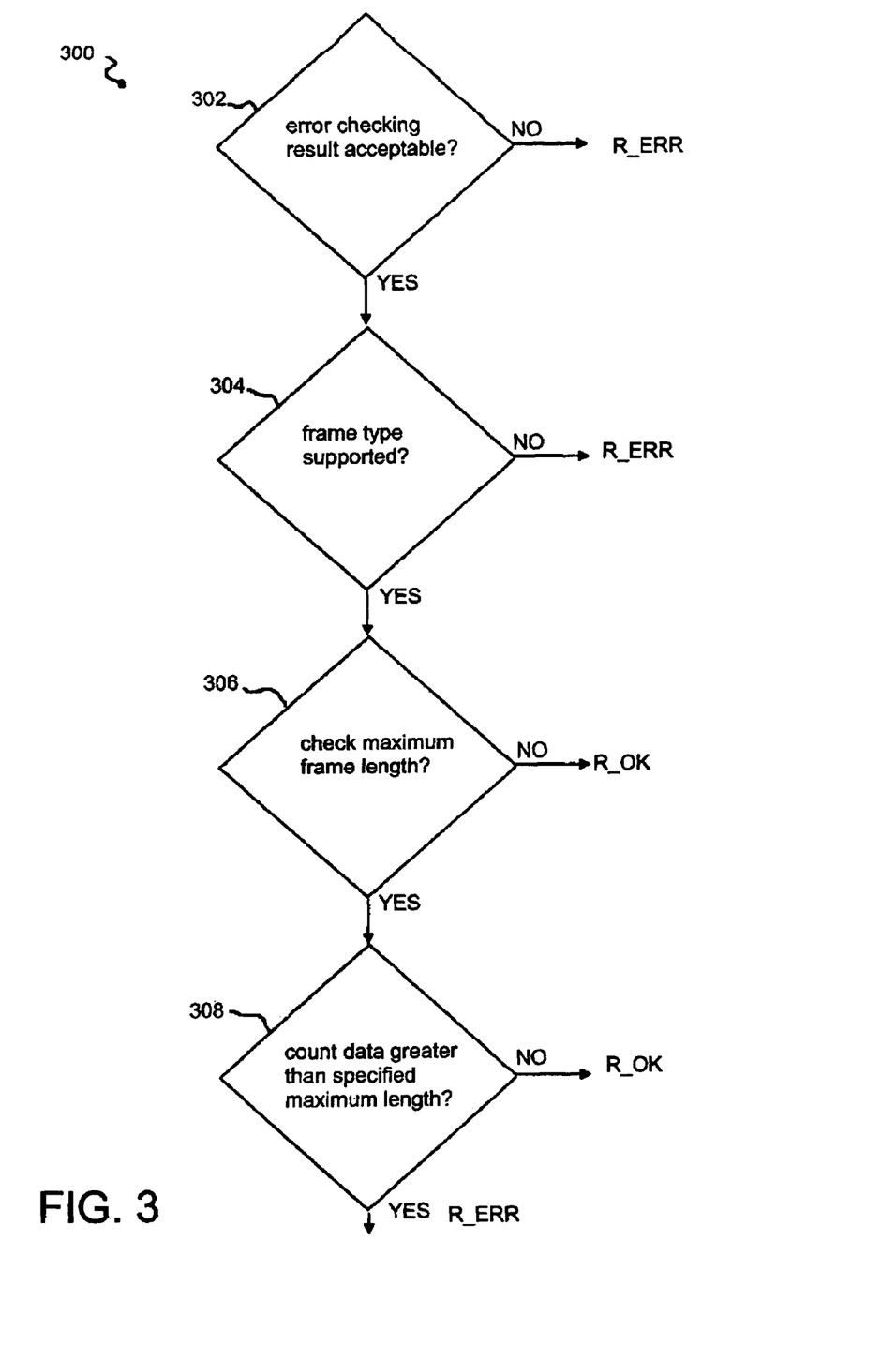
FIG. 3 is a flow chart illustrating operations according to an embodiment.

FIG. 3 illustrates a flow chart 300 of exemplary frame validation operations performed by the validation control circuitry 211 of memory 210. The validation control circuitry 211 may receive an error calculation result signal from the error checking engine circuitry 236. If the error calculation result signal indicates the error checking result is unacceptable in operation 302, e.g., the calculated CRC from the received FIS does not match the CRC from the transmitted FIS, then a negative reception status output signal may be provided by the validation control circuitry 211 via path 280. This may then result in a R_ERR primitive signal being transmitted back to the transmitting device that sent the received frame 170a. If the error checking result signal indicates the error checking result is acceptable in operation 302, then the frame validation operations continue with the next operation 304.

Operation 304 determines if the frame type is supported. This may be done by analyzing the V check bit of the particular row entry in array 212 associated with the received FIS type. Again, this V check bit may be a programmable data element to provide a customer with flexibility to summarily reject certain FIS types. If the frame type is not supported, then a negative reception status output signal may be provided, which may then result in a R_ERR primitive signal. If the frame type is supported, e.g., V check bit asserted then the frame validation operations continue with the next operation 306.

Operation 306 determines if the maximum length of the particular FIS type is to be checked. This may be done by analyzing the MFL check bit of the particular row entry in array 212 associated with the received FIS type. Again, this MFL check bit may be a programmable data element to provide a customer with flexibility in deciding whether to check a data count versus a maximum length for certain FIS types. If the maximum frame length is not to be checked, e.g., MFL bit de-asserted, then a positive reception status output signal may be provided, which may then result in a R_OK primitive signal. If the maximum frame length is to be checked, then the frame validation operations continue with the next operation 308.

Operation 308 checks if the count data of the received FIS is greater than the specified maximum length for that particular FIS type. The count data of the received FIS may be provided by the FIS data count circuitry 234. The specified maximum length may be the length specified in the particular row entry of array 212 associated with that FIS type. Again, this maximum FIS length may be a programmable data element to provide customer flexibility in specifying customer specific maximum FIS lengths. If the count data of the received FIS is greater than the specified maximum FIS length, then a negative reception status output signal may be provided (which may then result in a R_ERR primitive signal). If the count data of the received FIS is less than or equal to the specified maximum FIS length, then a positive reception status output signal may be provided (which may then result in a R_OK primitive signal).

As an alternative to operation 308, the frame validation operations performed by the validation control circuitry 211 of memory 210 may check count data of a received frame against an expected frame length and provide a negative reception status output signal if the count data is at all different (less than or greater than) than the expected frame length.

Most frame types have a static maximum length. However, there may be exceptions to this when the maximum frame length is variable. In such exception cases, a set up frame may first be received before subsequent data frames. The set up frame may specify the maximum length of the subsequent data frame. For instance, a programmed input/output (PIO) Setup FIS may specify a FIS length that is variable between minimum and maximum lengths. In one instance, this variable length may have a minimum of one Dword and a maximum of 2,048 Dwords.

If a Data FIS is received immediately after a PIO Setup FIS, the specified length in the PIO Setup FIS may be utilized by the frame validation circuitry 160a to check the length of the subsequent Data FIS. To accomplish this, the frame validation circuitry 160a may be responsive to a PIO Setup FIS to ascertain the specified length of the Data FIS. This information may be obtained from the header portion of the PIO Setup FIS. This specified length may then be programmed into the appropriate maximum FIS length entry for the applicable row entry in the array 212 for that FIS type prior to reception of a succeeding Data FIS. If the next FIS received after the PIO Setup FIS is not a Data FIS, this FIS length entry may be cleared. If the next FIS received after the PIO Setup FIS is a Data FIS, this FIS length may be utilized as part of the comparison performed by the validation circuitry 211 of memory 210. If the length of the subsequent Data FIS is different from that specified in the PIO Setup FIS, then a negative reception status output signal may be provided (which may then result in a R_ERR primitive signal).

Figure 4:
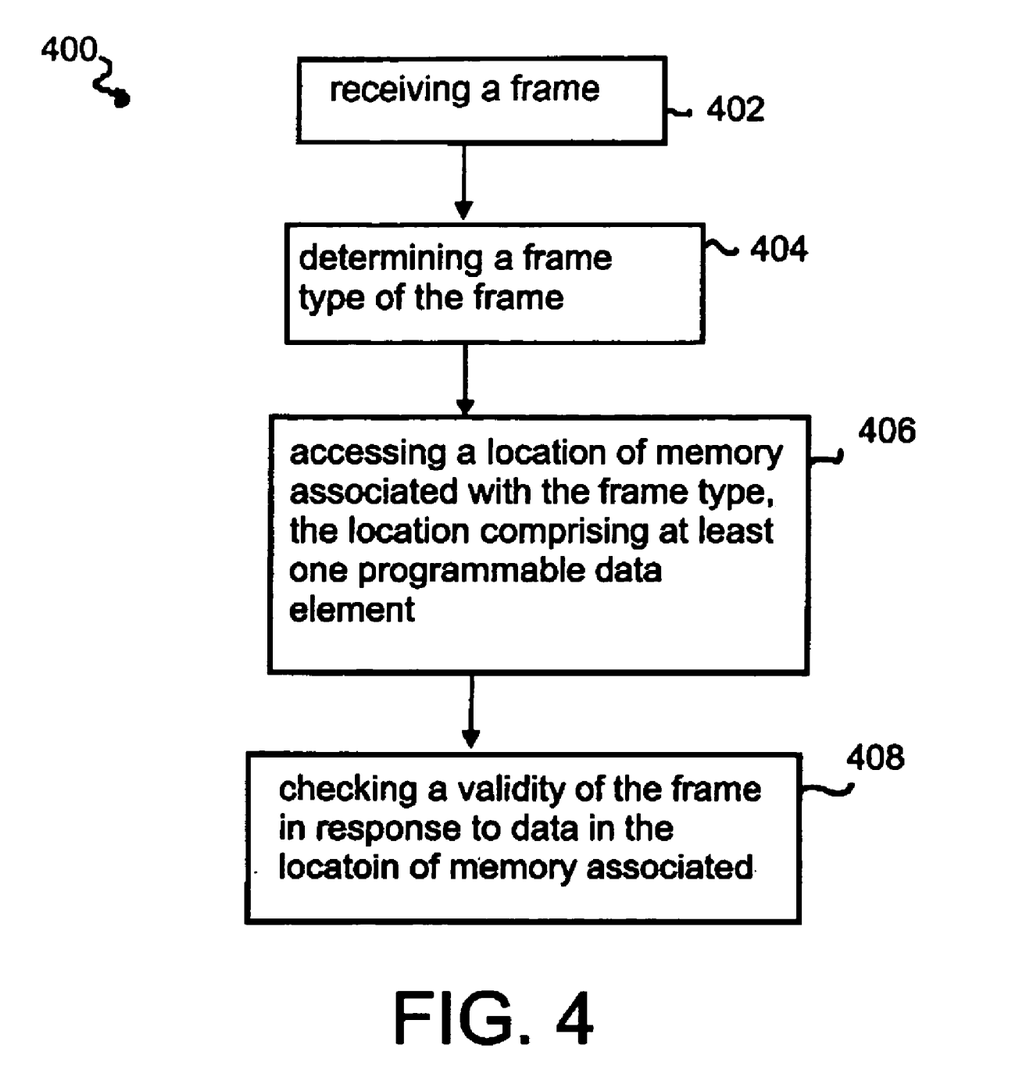
FIG. 4 is another flow chart illustrating operations that may be performed according to an embodiment.

FIG. 4 is a flow chart of exemplary operations 400 consistent with an embodiment. A frame is received in operation 402. Operation 404 includes determining a frame type of the received frame. This may be accomplished by the memory pointer circuitry 230 analyzing the contents of the FIS frame type 172 in an exemplary S-ATA compliant frame 170a. Operation 406 includes accessing a location of memory associated with the frame type. If memory includes a table structure, one of a plurality of rows of the table may contain data associated with a particular frame type. For example, if a FIS type is type 0, then row 220 of data in memory array 212 may be accessed. The location of data may comprise at least one programmable data element. This programmable data element may be any check bit such as the frame supported check bit or the maximum length check bit or may be the maximum length of the associated frame. Finally, operation 406 includes checking the validity of the frame in response to data in the location of memory associated with the frame type.

It will be appreciated that the functionality described for all the embodiments described herein may be implemented using hardware, firmware, software, or a combination thereof.

Thus, in summary, one embodiment may comprise an article. The article may comprise a storage medium having stored therein a memory array. For example, a storage medium such as memory 211 may have stored therein a memory array 212 as illustrated in FIG. 2. The memory array may comprise a programmable data element, and the storage medium also having stored therein instructions that when executed by a machine result in the following: analyzing data in a location of the memory array, the location associated with a predetermined frame type of a received frame; receiving an input signal indicating if the received frame contains an error; and providing an output signal indicating a negative receive response status if the input signal indicates an error in the received frame. In one embodiment, the machine that executes the instructions may include processing circuitry 270.

A system embodiment may include a circuit card comprising an integrated circuit. The circuit card may be capable of being coupled to a bus and the integrated circuit comprising a storage medium having stored therein a memory array. The memory array may comprise a programmable data element, and the storage medium also having stored therein instructions that when executed by a machine result in the following: analyzing data in a location of the memory array, the location associated with a predetermined frame type of a received frame; receiving an input signal indicating if the received frame contains an error; and providing an output signal indicating a negative receive response status if the input signal indicates an error in the received frame.

Another embodiment may include an apparatus comprising circuitry capable of receiving a frame, determining a frame type of the frame, accessing a location of memory associated with the frame type, the location comprising at least one programmable data element; and checking a validity of the frame in response to data in the location of memory associated with the frame type.

Advantageously, in these embodiments, frame validation circuitry may provide efficient and flexible frame validation. Efficiency is improved because the speed of the validation operations, e.g., the time from the start of the WTRM primitive to the receipt of the R_ERR or R_OK primitive may be lessened compared to the prior art which relies on firmware only to perform validation operations. The frame validation circuitry may also provide flexibility since the rows of data in the memory array 210 may contain programmable data elements such as check bits and maximum frame lengths. Therefore, customer specific check bits may also be utilized to provide control over whether a frame type is supported and whether a maximum frame length should be checked. Customer specific maximum lengths for specified FIS types may also be accommodated. In addition, a plurality of rows of data may also be programmed to create customer specific FIS types. The programmability of the data elements in the row of data combined with a number of unused row space also provides for added flexibility to accommodate new FIS types as they are developed.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An article comprising: a storage medium having stored therein a memory array, said memory array comprising a programmable data element, and said storage medium also having stored therein instructions that when executed by a machine result in the following:

providing data in a location of a memory array having a programmable data element, said location associated with a predetermined frame type of a received frame;
receiving an input signal indicating if said received frame contains an error;
providing an output signal indicating a negative receive response status if an amount of count data is greater than a maximum frame length, and in response to said negative receive response checking the validity of said frame;
checking a state of a first check bit and providing an output signal indicating a negative receive response status if said state of the first check bit indicates an unsupported state;
checking a state of a second check bit and providing an output signal indicating a positive reception status if the maximum frame length is not checked;
comparing the amount of count data for said received frame with the maximum frame length in said location of said memory associated with said predetermined frame type if the maximum frame length is to be checked; and
providing an output signal indicating a positive receive response status if said count data is less than or equal to said maximum frame length.

2. The article of claim 1, wherein said instructions that when executed by said machine also result in the following:
checking a state of a first check bit may include providing the first check bit of a row entry in the memory array associated with the predetermined frame type.

3. The article of claim 2, wherein said programmable data element comprises said first check bit.

4. The article of claim 2, wherein said instructions that when executed by said machine also result in the following:
receiving a set-up frame before a subsequent data frame if the maximum frame length is variable.

5. The article of claim 4, wherein said programmable data element comprises said second check bit and said maximum frame length.

6. A system comprising:
a circuit card comprising an integrated circuit, said circuit card being capable of being coupled to a bus, said integrated circuit comprising a storage medium having stored therein a memory array, said memory array comprising a programmable data element, and said storage medium also having stored therein instructions that when executed by a machine result in the following:
providing data in a location of a memory array having a programmable data element, said location associated with a predetermined frame type of a received frame;
receiving an input signal indicating if said received frame contains an error; providing an output signal indicating a negative receive response status if an amount of count data is greater than a maximum frame length, and in response to said negative receive response checking the validity of said frame;
checking a state of a first check bit and providing an output signal indicating a negative receive response status if said state of the first check bit indicates an unsupported state;
checking a state of a second check bit and providing an output signal indicating a positive reception status if the maximum frame length is not checked;
comparing the amount of count data for said received frame with the maximum frame length in said location of said memory associated with said predetermined frame type if the maximum frame length is to be checked; and providing an output signal indicating a positive receive response status if said count data is less than or equal to said maximum frame length.

7. The system of claim 6, wherein said instructions that when executed by said machine also result in the following:
checking a state of a first check bit in said location of said memory array associated with said predetermined frame type
may include providing the first check bit of a row entry in the memory array associated with the predetermined frame type.

8. The system of claim 7, wherein said programmable data element comprises said first check bit.

9. The system of claim 7, wherein said instructions that when executed by said machine also result in the following:
receiving a set-up frame before a subsequent data frame if the maximum frame length is variable.

10. The system of claim 9, wherein said programmable data element comprises said second check bit and said frame length.

11. A method comprising:
providing data in a location of a memory array having a programmable data element, said location associated with a predetermined frame type of a received frame;
receiving an input signal indicating if said received frame contains an error;
providing an output signal indicating a negative receive response status if an amount of count data is greater than a maximum frame length, and in response to said negative receive response checking the validity of said frame;
checking a state of a first cheek bit and providing an output signal indicating a negative receive response status if said state of the first check bit indicates an unsupported state;
checking a state of a second check bit and providing an output signal indicating a positive reception status if the maximum frame length is not checked;
comparing the amount of count data for said received frame with the maximum frame length in said location of said memory associated with said predetermined frame type if the maximum frame length is to be checked; and
providing an output signal indicating a positive receive response status if said amount of count data is less than or equal to said maximum frame length.

12. The method of claim 11, wherein the validation control circuit is configured to receive the error calculation result signal from the error checking circuit.

13. The method of claim 11, further comprising:
receiving a set-up frame before a subsequent data frame if the maximum frame length is variable.

14. The method of claim 13, wherein
said programmable data element comprises said first check bit.

15. The method of claim 11, further comprising:
receiving a first set up frame specifying a first frame type and a first frame length;
storing said first frame length in a location of memory associated with said first frame type;
receiving a second data frame immediately after said first set up frame; and
checking a validity of said second data frame in response to data in said location of memory associated with said first frame type from said first set up frame.

16. The method of claim 15, wherein said checking said validity of said second data frame comprises providing an output signal indicating a negative receive response status if a length of said second data frame is different than said first frame length.

17. The method of claim 15, wherein said first set up frame comprises a programmed input/output (PIO) Setup Frame Information Structure (FIS) and said second data frame comprises a data FIS.

18. An apparatus comprising:
- a received frame having a start of frame primitive, an end of frame primitive, a frame header and an Frame Information Structure of a particular type;
- a memory having an array including locations associated with a predetermined frame type;
- a memory pointer circuit configured to interpret information from the received frame, the memory pointer circuit configured to point to a row entry in the array;
- an error checking circuit configured to receive a CRC and the FIS from the frame, the error checking circuit configured to perform mathematical calculations and to provide an error calculation result signal to the memory;
- a data count circuit configured to calculate a determined length of the FIS, the data count circuit configured to provide the determined length to the memory; and
- a validation control circuit operatively connected with the memory, the validation control circuit configured to compare count data for the received frame with a maximum frame length in said location of said memory associated with said predetermined frame type if a maximum frame length is to be checked.

19. The apparatus of claim 18,
wherein the validation control circuit is configured to receive the error calculation result signal from the error checking circuit.

20. The apparatus of claim 18, wherein
the validation control circuit is configured to receive the determined length of the FIS from the data count circuit.

21. The apparatus of claim 20, wherein
the validation control circuit is configured to provide an output signal indicating a negative receive response status if said count data is greater than said maximum frame length, and in response to said negative receive response checking the validity of said frame.

22. The apparatus of claim 21 wherein the validation control circuit is configured to receive a first set up frame specifying a first frame type and a first frame length, storing said first frame length in a location of memory associated with said first frame type, receiving a second data frame immediately after said first set up frame; and
checking a validity of said second data frame in response to data in said location of memory associated with said first frame type from said first set up frame.

23. The apparatus of claim 22, wherein said checking said validity of said second data frame comprises providing an output signal indicating a negative receive response status if a length of said second data frame is different than said first frame length.

24. The apparatus of claim 22, wherein said first set up frame comprises a programmed input/output (PIO) Setup Frame Information Structure (FIS) and said second data frame comprises a data FIS.

* * * * *